United States Patent [19]

Fradeneck et al.

[11] 4,102,190
[45] Jul. 25, 1978

[54] METHOD AND APPARATUS FOR DETERMINING THE WEIGHT OF SLAG ON A BATH OF MOLTEN METAL

[75] Inventors: Ronald J. Fradeneck; Edmund J. Biancarelli, both of Bethlehem, Pa.

[73] Assignee: Bethlehem Steel Corporation, Bethlehem, Pa.

[21] Appl. No.: 785,727

[22] Filed: Apr. 7, 1977

[51] Int. Cl.$^2$ .................. G01G 9/00; G01F 23/14
[52] U.S. Cl. ......................... 73/302; 266/99; 356/157; 364/472; 364/567
[58] Field of Search ............ 73/302, 291; 356/156, 356/157, 159; 235/151.33, 92 WT; 266/99; 358/107

[56] References Cited

U.S. PATENT DOCUMENTS 3,780,581  12/1973  Acre et al. .................. 73/302

FOREIGN PATENT DOCUMENTS 353,151  10/1972  U.S.S.R. .................. 235/151.33

OTHER PUBLICATIONS

Mechanical Engineers' Handbook, 6th ed. N.Y., McGraw-Hill Book Co. Inc. 1958, pp. 3–57.

Primary Examiner—Richard C. Queisser
Assistant Examiner—Joseph W. Roskos
Attorney, Agent, or Firm—Joseph J. O'Keefe; Michael J. Delaney

[57] ABSTRACT

The weight of the slag floating on a steel bath is determined by multiplying the surface area of the slag by the pressure head at the slag-steel interface. The pressure head is determined by a method including passing a gas through a tubular member that is lowered through the slag and into the steel.

3 Claims, 6 Drawing Figures

METHOD AND APPARATUS FOR DETERMINING THE WEIGHT OF SLAG ON A BATH OF MOLTEN METAL

BACKGROUND OF THE INVENTION

This invention relates to the teeming of molten metal. More particularly, it relates to a method and apparatus for determining the weight of molten slag on a bath of molten steel to be teemed into either ingot molds or a continuous casting machine.

When a heat of steel is tapped, from a basic oxygen furnace, for example, the furnace operator cannot prevent a small quantity of slag from passing from the furnace into the teeming ladle. At present, many teeming ladles are provided with weight indicators showing the weight of the ladle contents, viz., the molten steel and the molten slag floating on the molten steel. Without knowing the weight of the steel alone, it is difficult to teem a heat of steel without either pouring some slag into the last ingot mold, thereby producing a "slag top" ingot, or producing an unusable ingot butt.

Slabs of steel rolled from slag top ingots may require special testing before further processing. In addition, such slabs require up to an additional 15% or more discard at the slabbing mill shear. Slag top ingots cause accelerated mold deterioration. In some cases, slag top ingots cannot be removed from the mold by the ordinary stripping process, and the mold must be destroyed to obtain the ingot.

The last ingot poured, known as the ingot butt, must be a minimum height, e.g., 65 to 70 inches, if it is to be rolled into a slab. Shorter ingot butts must be scrapped, resulting in a serious loss in yield.

If the weight of the steel in the ladle were accurately known, it would be possible to decrease the frequency of slag top ingots. In addition, the number of unrollable ingot butts could be reduced by distributing the steel ordinarily used for the butt among the last three or four ingots poured.

It is an object of this invention to provide a method and an apparatus for determining the weight of the molten slag on a bath of molten metal. From this determination, the weight of the molten metal itself can easily be determined.

SUMMARY OF THE INVENTION

We have discovered that the foregoing object can be obtained by measuring those geometrical parameters that permit the surface area of the molten slag in the ladle to be calculated. For example, if the surface area of the slag is circular, the appropriate parameter would be the diameter. The pressure head at the slag-metal interface is also measured. The weight of the slag is then computed by multiplying this pressure head by the slag surface area.

The pressure head is determined by inserting a consumable tubular member downwardly into the slag-metal bath until the member passes below the interface between the slag and the molten metal. A gas is passed downwardly at a constant rate through this tubular member while it is descending as well as after its downward movement has stopped.

At about the instant that the bottom of this tubular member is at the slag-metal interface, the pressure head at the bottom of this member is measured.

This instant is determined in one of two ways. At times, the change in slope of the pressure head as a function of time (and hence depth of the member in the slag-metal bath) can be detected as the member passes from the slag into the metal. At other times, this change in slope cannot be detected. At these other times, downward movement of the member is stopped when the pressure head at the bottom of the member exceeds a value, e.g., 3 psi., that is in excess of the maximum pressure of the slag. The member is then permitted to be consumed by the molten metal until the bottom of the member is at the slag-metal interface.

DESCRIPTION OF THE PREFERRED EMBODIMENT

Figure 1:
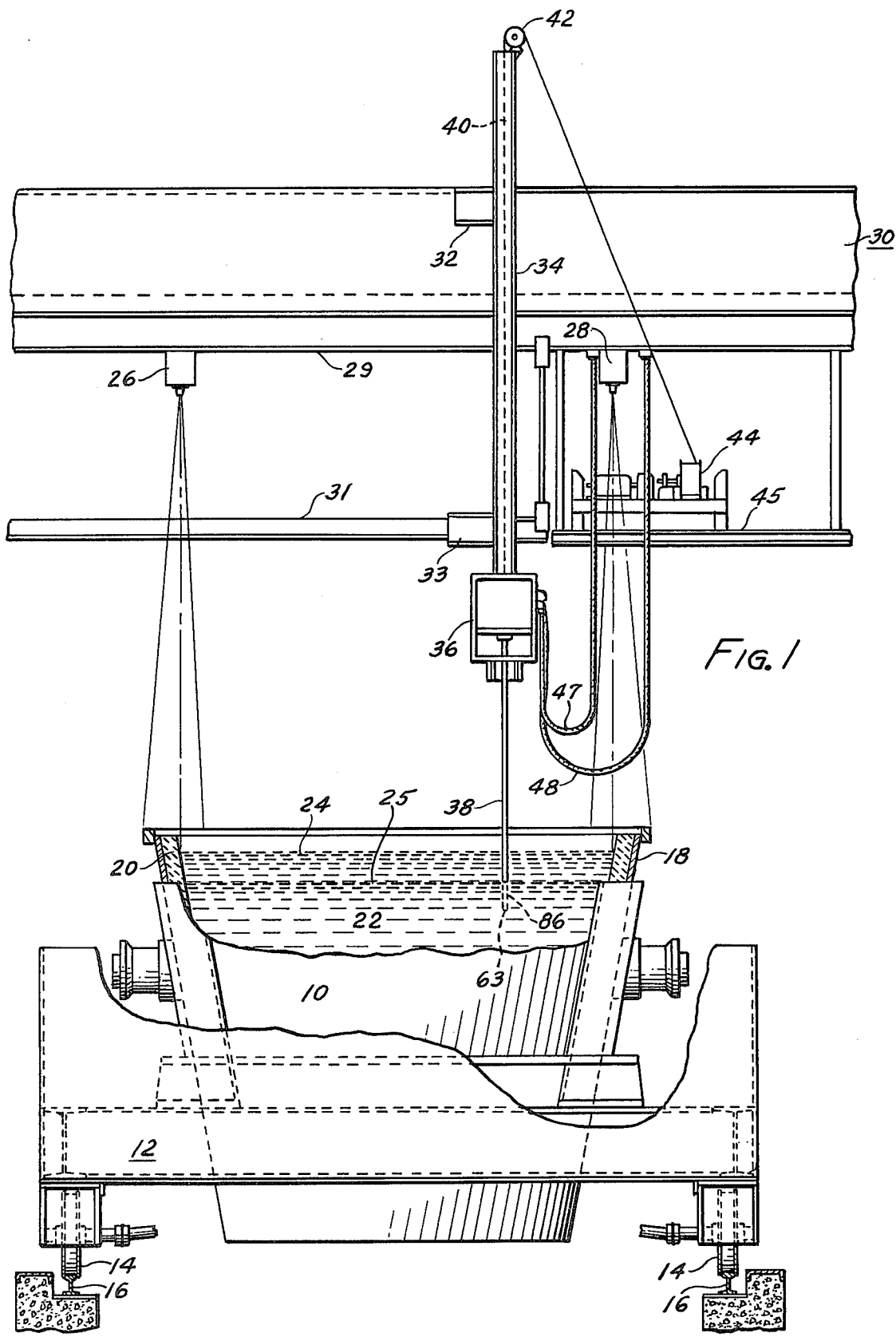
FIG. 1 is a diagrammatic view of the apparatus of the invention.

FIG. 1 shows a teeming ladle 10 supported within a transfer car 12. The car 12 is provided with wheels 14 and drive means (not shown) so that the car can be moved on rails 16 from one position, beneath a basic oxygen furnace, for example, to another position, e.g., beneath the testing apparatus of the invention.

The ladle 10 has a circular horizontal cross section and comprises a steel shell 18 lined with refractory bricks 20. The bottom of the ladle 10 is provided with a slide gate nozzle or a stopper rod (not shown) for teeming molten steel 22 into either ingot molds (not shown) or a continuous casting machine (not shown). The steel is covered with a molten slag 24, the slag-steel interface being indicated at 25.

The ladle 10 is carried past a pair of overhead non-contact measuring systems, e.g., optical cameras 26 and 28, respectively, affixed to the bottom 29 of the charging floor 30. A suitable optical camera is a high temperature linear array camera such as that sold by Diamond Electronics of Lancaster, Ohio.

Each camera has its lens disposed about 416 cm above the lip of the ladle 10. The center lines of the lenses are 386 cm apart, each center line being perpendicular to the approximate point of intersection of the slag surface and the brick lining of the ladle. The lenses are 12.5 mm, F:1.4, and each camera has 256 sensing elements. The field of view of each camera is thus 110 cm, and the total system error is 1.27 cm.

Affixed to the charging floor 30 and a subfloor 31 is a pair of brackets 32 and 33 to which a column 34 is attached. The column 34 is provided with longitudinal rails (not shown) along which a carriage 36 may traverse. Carriage 36 houses portions of the control equipment for the subject invention. A tubular member 38 is attached to the carriage 36 and passes vertically through the bottom of the carriage 36. Carriage 36 may be raised and lowered by means of a cable 40 passing along column 34 and over a sheave 42 to a hoist and motor assembly 44 affixed to a subfloor 45. Electrical and pneumatic power is supplied to the carriage 36 by means of cables 47 and 48, respectively.

Figure 2:
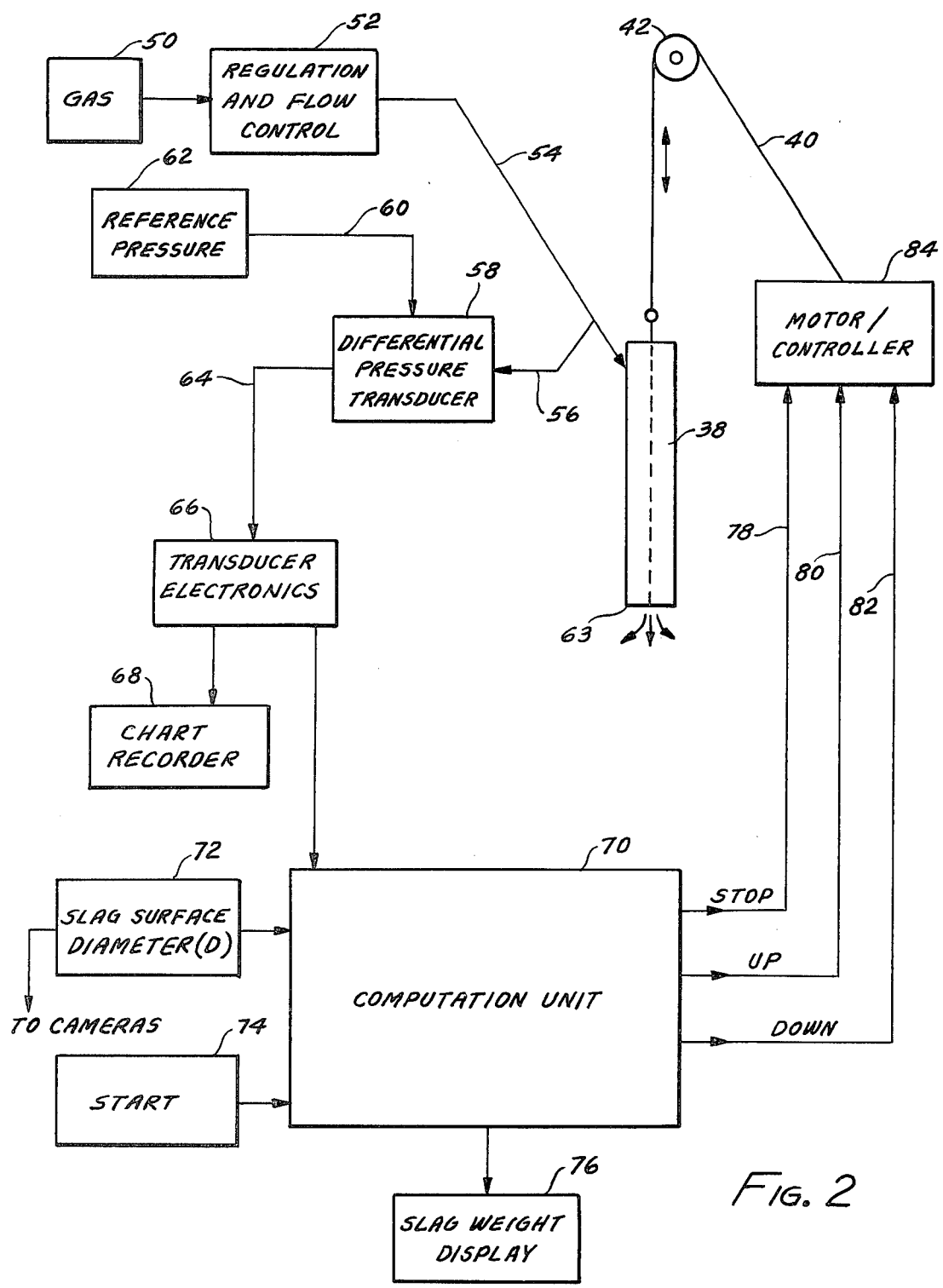
FIG. 2 is a schematic diagram of the slag weight calculation apparatus.

The apparatus for determining slag weight is shown in FIG. 2 as comprising a source 50 of gas under pressure connected so as to pass through regulation and flow control means 52 and enter the top of tubular member 38 through line 54. Also connected to the line 54 is a line 56 that leads to a differential pressure transducer 58. The transducer 58 also is connected by a line 60 to a source of reference pressure 62, e.g., ambient pressure. The output of the transducer 58 is an electrical signal indicative of the difference in pressure between the reference and that at the bottom 63 of the member 38.

This electrical signal is supplied through a line 64 to a circuit 66 that: (1) produces an analog signal that drives the ordinate of a chart recorder 68, and (2) produces a binary coded decimal signal that is sent to a slag weight computation unit 70. The unit 70 receives a slag surface diameter signal from a circuit 72 connected to the cameras 26 and 28. Unit 70 also is connected to a control button 74 that starts the computing process. The unit 70 produces a slag weight signal that may be sent to a display 76. In addition, unit 70 is connected by lines 78, 80 and 82 to a motor controller 84 that drives the cable 40 that controls the movement of member 38. The detailed operation of unit 70 will be described later in the specification.

Figure 3:
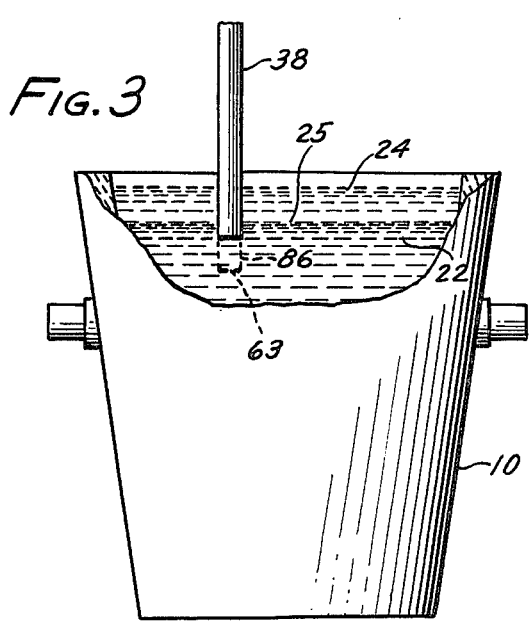
FIG. 3 is an enlarged schematic view of the tubular member immersed in the contents of a ladle.

FIG. 3 shows member 38 immersed in slag 24 and molten steel 22 in a teeming ladle 10. A portion 86, shown in dashed lines, of member 38 has been consumed by the molten metal.

Figure 4A:
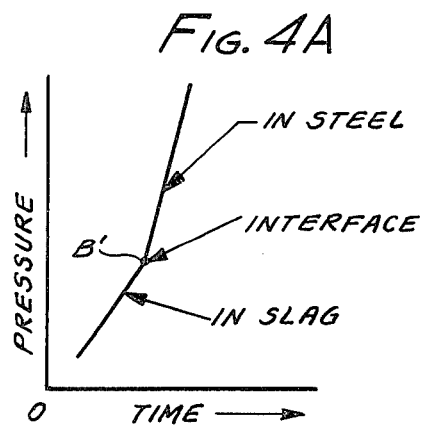
FIG. 4A is an enlarged view of a section of FIG. 4.
Figure 4:
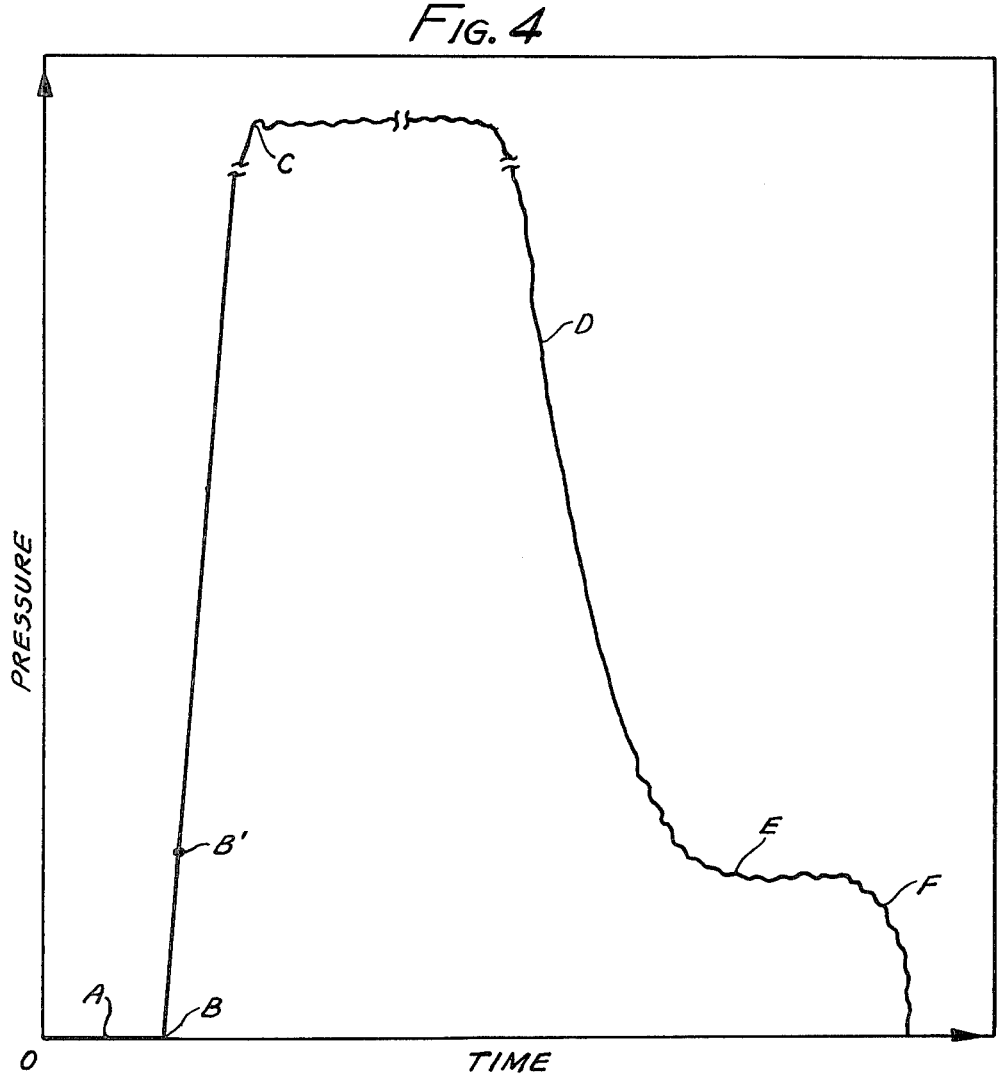
FIG. 4 is a graph showing the pressure head at the bottom of the tubular member as a function of time.

FIG. 4 is a graph showing the pressure differential between the reference pressure and the pressure at the bottom 63 of member 38 during a slag weight measuring cycle. At position A, member 38 is raised above the slagsteel bath and, hence, there is no pressure differential. At B, member 38 has been inserted into the slag. The pressure differential is seen to increase almost linearly as member 38 passes through the slag 24 and into the molten steel 22 at B'. At C, the pressure has reached an established limit, and lowering of member 38 is stopped. At D, a portion of the immersed part of member 38 has been consumed by the molten steel so that the pressure has decreased. At E, the immersed portion of member 38 has been completely consumed by the steel, and the pressure reading is an accurate indication of the pressure head at the slag-steel interface 25. At F, member 38 is being withdrawn from the slag.

It is clear from FIG. 4 that the approximate time that the bottom 63 of member 38 is at the slag-steel interface 25 can be readily determined by noting the occurence of point E on the graph. However, it is also clear that using the graph of FIG. 4 to determine the instant that the bottom 63 of member 38 is at the slag-steel interface 25 requires a considerable amount of time, e.g., 40 seconds. In addition, a substantial amount of member 38, e.g., 30.5 cm, is consumed by the steel.

FIG. 4A shows an enlarged section of the graph of FIG. 4. As shown, the rate of change of pressure as a function of time increases noticeably as the bottom 63 of member 38 passes from the slag 24 into the steel 22 at B'. This characteristic is utilized by the computation unit 70, shown in detail in FIG. 5.

Figure 5:
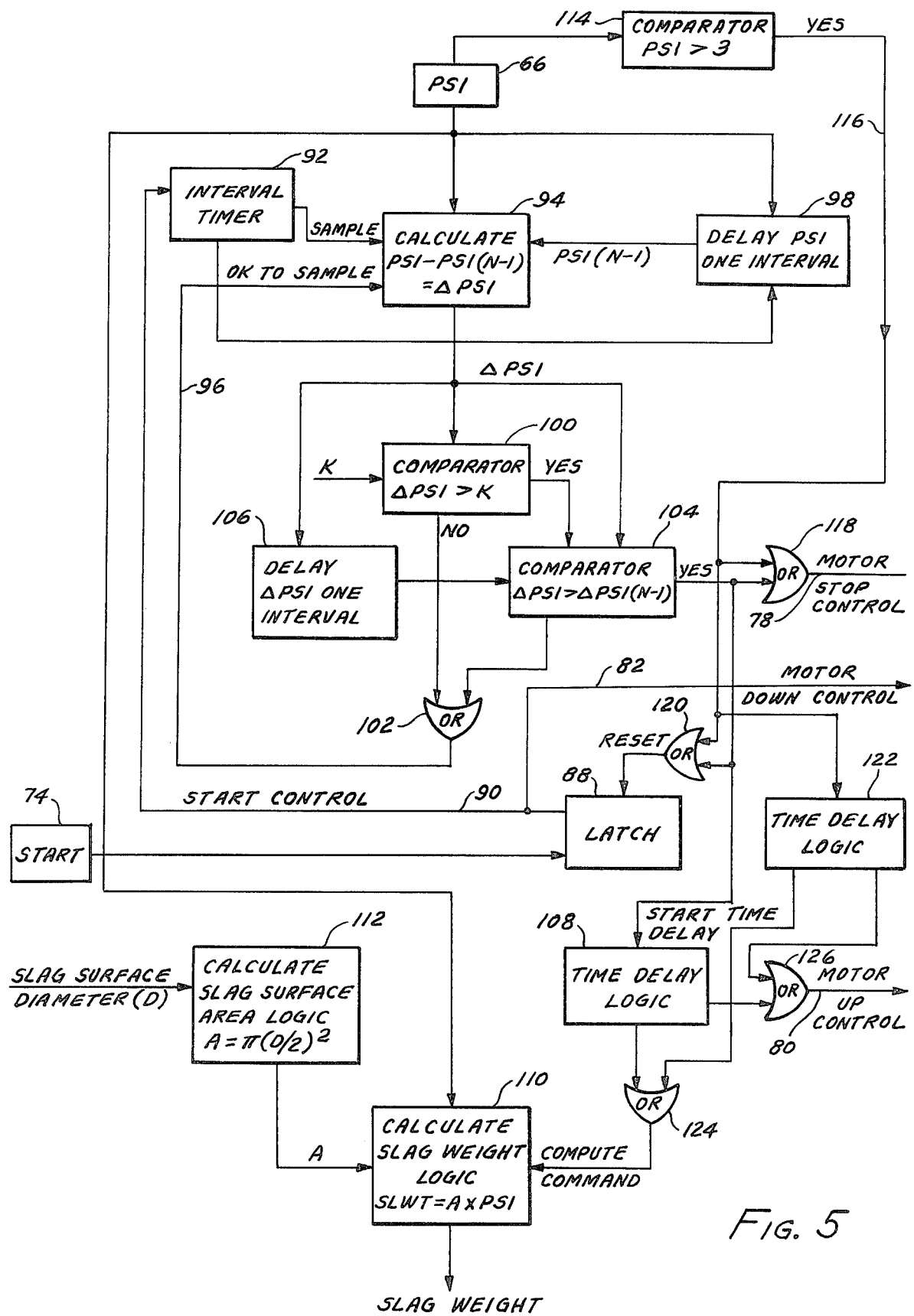
FIG. 5 is a block diagram of the computation unit of FIG. 2.

Referring to FIG. 5, depressing the start button 74 enables a latch circuit 88 to output a start control signal that travels along line 82 to the motor controller 84 and along a line 90 to an interval timer 92. In response to this signal, motor controller 84 causes tubular member 38 to descend toward the teeming ladle 10, while interval timer 92 produces a sample command signal and clock pulses at precise intervals of time, e.g., every 0.10 seconds. The sample command is supplied to one input of a 4-input calculator 94. Calculator 94 also receives an "OK to Sample" signal along line 96, a binary coded decimal signal of the instantaneous pressure at the bottom 63 of member 38 from circuit 66, and a signal of this pressure, delayed by one interval, from a delay circuit 98.

The output from calculator 94 is a signal representing the change in pressure during the first interval. This signal is sent to a comparator 100 wherein a constant K is subtracted from it. The constant K is empirically determined to be the maximum possible rate of change in pressure in slag of maximum density. Of course, the speed of descent of member 38 and the time interval between samplings must be constant.

A negative output from comparator 100, indicating that the bottom 63 of member 38 is still in the slag layer, is sent to one input of an OR circuit 102. The output from OR 102 sends an "OK to Sample" signal to calculator 94.

A positive output from comparator 100, indicating that the bottom 63 of member 38 has passed below the slagsteel interface 25, is sent to one input of a 3-input comparator 104.

Calculator 94 also sends a change-in-pressure signal to delay circuit 106 and to a second input of comparator 104. Delay circuit 106 receives an interval signal from timer 92 and sends a delayed change-in-pressure signal to the third input of comparator 104. The output from comparator 104 is positive, indicating that the bottom 63 of member 38 has passed beyond the slag-steel interface 25, only if the following two conditions exist: (1) the change in pressure during the instant interval exceeds the maximum possible pressure change in slag; and (2) the change in pressure during the instant interval is greater than the change in pressure during the preceding interval. A positive output from comparator 104 passes along line 78 and causes motor controller 84 to stop the lowering of member 38. A positive output also resets latch 88 and initiates time delay logic 108. If the condition from comparator 104 is not true, a signal is sent to OR 102 that causes calculator 94 to continue sampling.

Time delay logic 108 sends a compute command to logic 10 and provides time for slag weight to be calculated. At the end of this time, a signal is sent along line 80 to motor controller 84 that causes member 38 to be raised out of the teeming ladle 10. Logic 110 continuously receives a binary coded decimal pressure signal from circuit 66 and also receives a signal representing slag surface area from calculator 112. Calculator 112 receives the slag diameter signals from the cameras 26 and 28, selects the maximum diameter signal, and calculates area using the formula $A = \pi(D/2)^2$. Calculator 110 computes slag weight using the formula $W_s = PA$, where:

$W_s$ = weight of the slag $P$ = slag pressure head $A$ = surface area of the slag.

If the output from comparator 104 does not become positive, because of an insufficiently sharp change in the pressure slope as member 38 passes through the slag-steel interface 25, for example, member 38 continues to descend into the molten steel 22. Comparator 114, which has been receiving the output from circuit 66, has been in an inactive state and remains in such a state until the output from circuit 66 exceeds 3 psi. At this point, comparator 114 outputs a signal along line 116 to a first OR 118, a second OR 120, and a time delay logic 122. This results in the stopping of the motor that drives the carriage 36 and the resetting of latch 88. In addition, it initiates a time interval in logic 122, sufficient for the lower end of member 38 to be consumed by the molten steel 22 so that the bottom 63 of member 38 is at the slag-steel interface 25. At the end of this interval, a compute command is sent through OR 124 to calculator 110 and, after a short time delay, a signal is sent to OR 126 that causes the motor to raise member 38 out of the slag.

We claim:

1. A method of determining the weight of the molten slag covering a bath of molten metal, comprising:
   (a) determining the surface area of the slag and the pressure head at the slag-metal interface,
   (b) multiplying said surface area by said pressure head,
   (c) said pressure head is determined by:
      (i) inserting a consumable tubular member downwardly into said vessel until said member passes below the interface between said molten slag and said molten metal while passing a gas at a constant flow rate through said member, and
      (ii) measuring the pressure head at the bottom of said tubular member at about the instant said bottom is at said interface, and
   (d) the instant the bottom of said tubular member is at said interface is determined by:
      (i) maintaining constant the downward movement of said tubular member,
      (ii) measuring the pressure at said bottom at constant intervals,
      (iii) subtracting the maximum change in pressure that can occur in said slag during said interval from the change in pressure between each successive interval,
      (iv) subtracting the change in pressure at each (n-1) interval from the change in pressure at each successive interval,
      (v) in response to a control signal, calculating the pressure head at the bottom of said member, and
      (vi) producing a control signal when one of the following two conditions exists:
         (a) the results of the subtractions of both (iii) and (iv) are positive; and
         (b) a predetermined time interval has elapsed since the pressure head at said bottom exceeded a predetermined value.

2. Apparatus for determining the weight of the molten slag covering molten metal in a vessel, comprising:
   (a) a consumable tubular member adapted to be lowered through said slag and into said molten metal,
   (b) means for supplying a gas at a constant flow rate to said tubular member,
   (c) means for determining the pressure head at the bottom of said tubular member,
   (d) means for determining the approximate instant when the bottom of said tubular member is at the interface between said molten slag and said molten metal,
   (e) means for determining the surface area of said molten slag, and
   (f) means for computing the weight of said molten slag by multiplying the surface area of said slag by the pressure head at the bottom of said tubular member when the bottom of said member is at the interface between said molten slag and said molten metal.

3. Apparatus for determining the weight of the slag covering a bath of molten metal, comprising:
   (a) means for determining the surface area of the slag,
   (b) means for determining the pressure head at the slag-metal interface, comprising:
      (i) a consumable tubular member adapted to be lowered through the slag and into the metal,
      (ii) means for passing a gas at a constant flow rate downwardly through said tubular member, and
      (iii) means for determining when the bottom of said tubular member is at said slag-metal interface, and
   (c) means for combining the outputs of means (a) and means (b) to obtain said weight of the slag.

* * * * *